Oct. 28, 1969 J. C. SARGENT ET AL 3,475,262
SPACECRAFT HEAT SHIELD CONSTRUCTION AND METHOD OF MAKING SAME
Filed Sept. 17, 1965
FIG. 1.
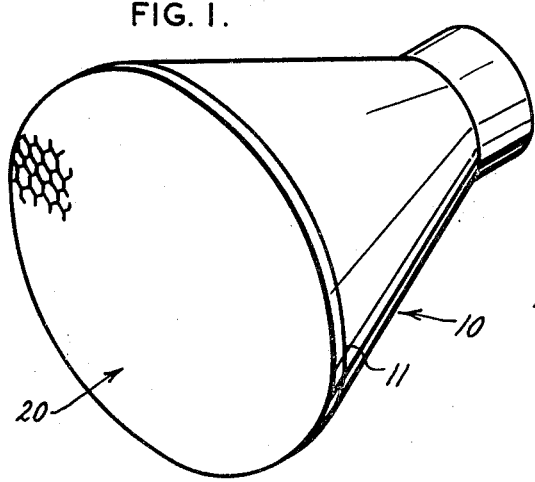
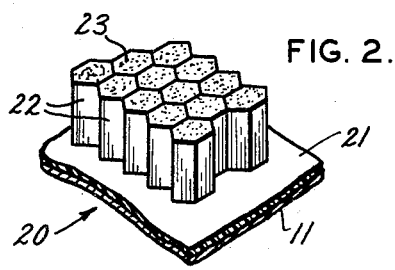
FIG. 2.
FIG. 4.
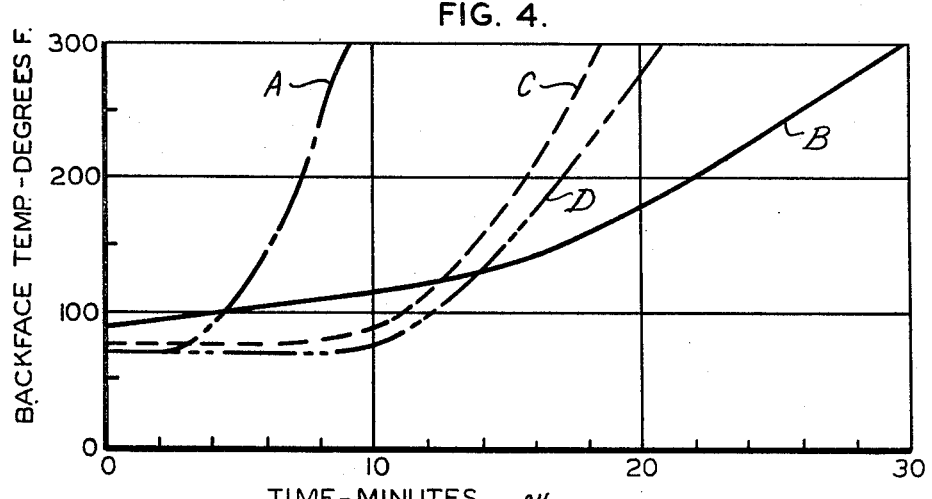
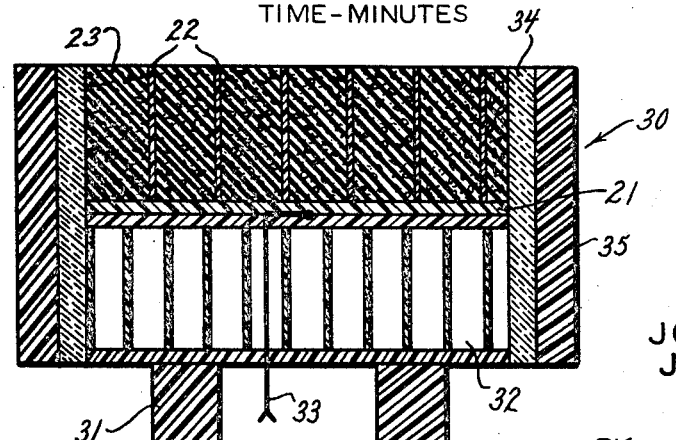
FIG. 3.
INVENTORS
JOHN C. SARGENT
JAMES C. BLOME
WALTER D. TIMS
JOHN P. MILLS
BY Gravely, Lieder + Woodruff
ATTORNEYS

United States Patent Office 3,475,262
Patented Oct. 28, 1969

3,475,262
SPACECRAFT HEAT SHIELD CONSTRUCTION AND METHOD OF MAKING SAME
John C. Sargent, Seattle, Wash., and James C. Blome, Bridgeton, Walter D. Tims, Florissant, and John P. Mills, St. Charles, Mo., assignors to McDonnell Aircraft Corporation, St. Louis, Mo., a corporation of Maryland
Filed Sept. 17, 1965, Ser. No. 488,221
Int. Cl. B32b 3/12, 5/18, 31/14
U.S. Cl. 161—68                 8 Claims

ABSTRACT OF THE DISCLOSURE

A spacecraft heat shield construction comprising a substrate, a thermal insulating honeycomb positioned on the substrate so that the substrate closes one end of the honeycomb cells and a curable fluid silicone positioned in the honeycomb and foamed under pressure during curing to produce an ablative structure having a density of less than 25 pounds per cubic foot.

---

The present invention relates to spacecraft heat shield construction and more particularly to a heat shield construction utilizing a honeycomb filled with ablative foam material.

Heretofore, one of the major problems in affording heat shield protection during initial entry or re-entry of spacecraft into various atmosphere was that the heat shield constrution required undesirable high density materials. Such heat shields have utilized various materials such as silicones, phenolics and other high density materials to afford sufficient heat protection by ablation, absorption, and radiation.

The present invention affords a spacecraft with a heat shield which is of a very low density, foam material and affords higher heat protection than has heretofore been achieved by previous heat shield constructions.

Briefly, the invention contemplates a spacecraft with a heat shield having an open-faced, honeycomb structure of fiber glass or other thermal insulating material containing, within the interstices of the honeycomb, foamed, cellular ablative material of charring organic polymers. The foamed ablator material may typically consist of a methyl silicone resin with tetra-methyl guanadine as a curing agent. The resin may be foamed by supplying an excess of curing agent. Also, the resin may include the addition of hollow polymeric spheres. The material may be poured into the honeycomb support structure, and then cured at a moderately high temperature which allows such material to foam-in-place during curing.

It is, therefore, an important object of the invention to provide a spacecraft having a heat shield of low density cellular material capable of ablation.

It is another object of the invention to provide a heat shield including a low density, cellular material which uniformly ablates from one face thereof.

It is another object of the invention to provide a heat shield to an intermediate portion of the spacecraft to be protected, the heat shield being of a low density, charring organic polymer.

It is another object of the invention to provide a heat shield for spacecraft having an open-face honeycomb structure having a cellular, low density charring organic polymer retained within the interstices of said honeycomb structure.

It is another object of the invention to provide a low density, foamed-in-place charring organic polymer protective heat shield which may be secured to a spacecraft surface for protection against heat generated by the spacecraft entering an atmospheric environment.

It is another object of the invention to provide a heat shield ablative material of charring organic polymer having a low density cellular structure.

It is another object of the invention to provide a method of making heat shields with a low density, cellular, charring organic polymer.

It is another object of the invention to provide a method of making a heat shield having an open-faced, honeycomb structure with the interstices of such structure filled with a low density, cellular, charring organic polymer.

It is another object of the invention to provide a method of making heat shields for spacecrafts having an open-faced honeycomb structure, the interstices of which contain a foamed-in-place, low density, cellular material of a charring organic polymer.

It is another object of the invention to provide a low density, thermal insulating material for rockets and aircraft, said material being a foamed material which can be used alone or within the interstices of a honeycomb.

These and other objects and advantages of the invention will become apparent to those skilled in the art when taken in conjunction with the appended claims and the drawings wherein:

FIG. 1 depicts a spacecraft and heat shield appertaining to the invention;

FIG. 2 depicts a fragmentary, enlarged perspective of the heat shield structure secured to the spacecraft;

FIG. 3 depicts a test sample for testing the quality of the heat shield construction appertaining to the invention; and FIG. 4 is a time-temperature diagram illustrating the performance of the invention.

Referring now to FIGS. 1 and 2, the invention contemplates a spacecraft 10 adapted for free flight in a space environment. Secured to the leading edge or face 11 for environmental entry is a heat shield 20. The honeycomb heat shield 20 includes base 21 (preferably phenolic) of a suitable material which may be secured to the leading edge 11 in any known manner. The honeycomb includes a multiplicity of open cells 22. Within the interstices of the open cells, a low density, cellular, foamed ablator material 23 is provided. Although the honeycomb has been illustrated in the drawing with hexagonal cells, it will be understood that the cells may be square, rectangular, sine wave, etc.

During the atmospheric entry phase the spacecraft 10 is maintained with an attitude in which the greatest entry heat is generated against the exposed surface of ablator material 23 of heat shield 20. The structural integrity of the ablative material 23 in operation and after charring is maintained by honeycomb cells 22.

The preferred ablative material of the invention is made of an organic polymer combined with a foaming agent which upon curing forms a uniform cellular, foamed organic structure. The foaming agent permits ready handling of the ablative material and avoids the necessity of trying to pour a high viscosity liquid into the honeycomb interstices. Moreover, hollow spheres may be added to the ablative material prior to curing to assist in maintaining a uniform cellular structure of the ablative material. The ablative material may be poured as a relatively low viscosity liquid into interstices of the honeycomb and foamed under controlled environmental conditions to achieve the desired uniformity and hence the best ablative characteristics. By utilizing the ablative materials of the present heat shield, it is possible to dissipate heat by radiation as well as by absorption in the ablative process.

Typically, the ablative material may be a curable fluid silicone utilizing a curing agent and a blowing or foaming agent. The foaming agent may be an excess amount of the curing agent. A curable fluid silicone that may be used is Sylgard 182 of Dow Corning which is a methyl and phenyl substituted silicone which may incorporate relatively small amounts of vinyl and hydrogen substituents on silicone atoms to provide for curing by a platinum catalyst. The cured silicone is constituted of a high polymer dimethyl-siloxane fluid in which a small proportion of the organic substituents are vinyl. The di-methyl-siloxane has a dissolved solid, resinous copolymer of silica and $R_3SiO_{1/2}$ in which the R groups are principally methyl and a small proportion are vinyl. In the composition, the vinyl represents less than 10 mole percent of the total organo substituents bonded to silicone atoms. Sufficient phenyl and methyl and hydrogen substituted fluid silicone is added such that the hydrogen will be substantially equivalent to the amount of vinyl. In this silicone there are substantially three hydrogen per seven phenyl and methyl radicals on a mole basis.

The silicone employed in accordance with the invention is preferably one in which the organo substituents are monovalent hydrocarbon radicals such as phenyl, methyl, and vinyl, and in which other substituents present are intercondensible for purposes of curing the fluid silicone to a solid.

The general type of silicone useful in this invention is illustrated by the following; any of which may contain other substituents for effecting cure in the various indicated systems.

(1) Copolymers of dimethylsiloxane, monomethylsiloxane, monophenylsiloxane and diphenylsiloxane.
(2) Copolymers of monophenylsiloxane, monomethylsiloxane, and diphenylsiloxane.
(3) Copolymers of trimethylsiloxane, and $SiO_2$.
(4) Copolymers of phenylmethylsiloxane, monophenylsiloxane and monomethylsiloxane.
(5) Copolymers of monophenylsiloxane and disiloxane.
(6) High molecular weight dimethylpolysiloxane.
(7) Mixtures of the above polymers.

The curable fluid silicone resin is foamed by using any of the known blowing or foaming agents for various resins, for example, N,N'-dimethyl-N,N'-dinitroso terephthalamide is suitable, and may be obtained as Nitrosan from Du Pont Company.

Another suitable material for making the foamed ablator material of the invention is methyl-phenyl-silicone resin (RTV 603) and tetra-methyl guanidine (SRCO5), both of which are made by General Electric Company. In this combination, an excess of the curing agent tetramethyl guanidine is utilized for foaming or blowing the ablator material.

Some of the various filler materials employed to increase the efficiency of foamed ablative composites are:

(1) Finely divided carbon powder (Columbian Carbon Co., "Germantown" brand of Lampblack).
(2) Carbon fibers (CFA ¼, 0.2 long, 0.0003 Nominal O.D., H. I. Thompson Company).
(3) Potassium titanate fibers (Du Pont Company "tipersul" brand of dispersed potassium titanate fibers).
(4) Hollow polymeric spheres (Union Carbide Co., Phenolic Microballoons).
(5) Hollow silica spheres (Emerson & Cuming "Eccospheres").

Some honeycomb materials which have been used in producing the heat shield appertaining to the invention include:

(1) Heat resistant phenolic-fiber glass.
(2) Carbon cloth-phenolic.
(3) Refrasil-phenolic.

The following are specific examples of foamed ablative materials appertaining to the invention which have been prepared in heat shields.

EXAMPLE NO. 1

Formulation

| Material: | Parts by weight |
|---|---|
| Methyl-phenyl-silicone resin (General Electric Co. RTV 603) | 85 |
| Curing Agent (tetra-methyl guanidine, General Electric Co. SRCO5) | 0.25 |
| Hollow polymeric spheres (phenolic microballoons) | 15 |
| Blowing (or foaming) agent (excess curing agent) | 0.05 |

Process

The materials are combined and thoroughly mixed in a clean, stainless steel vessel. The thoroughly mixed material is next poured into a honeycomb support structure similar to that depicted in FIGS. 1 and 2. The structure is placed in an enclosure and de-aired by reducing the pressure to 10 torr. The de-aired structure is then placed in an oven previously heated to 300° F., plus or minus 25° F. The ablative material should be completely foamed and cured within approximately thirty minutes. Additional time may be utilized if necessary to fully cure the material. After the material has been cured, the excess foam is removed from the structure thus providing a uniform overall depth to the heat shield structure.

EXAMPLE NO. 2

Formulation

| Material: | Parts by weight |
|---|---|
| Dow Corning Sylgard 182 resin | 77.0 |
| Dow Corning Sylgard 182 curing agent | 7.7 |
| DuPont Nitrosan (Nitrosan is Du Pont's chemical blowing agent composed of 70% N,N'-dimethyl - N,N' - dinitrosoterephthalamide and 30% inert diluent) | 2.6 |
| Phenolic micro-balloons (hollow spheres) | 12.7 |
| | 100.0 |

Note: Sylgard 182 is a product of Dow Corning Corporation, Nitrosan is manufactured by Du Pont, and the phenolic micro-balloons may be obtained from Union Carbide Corporation.

Process

The Sylgard 182 resin is essentially combined with the foaming agent Nitrosan in a stainless steel container and is completely and uniformly dispersed throughout the silicone resin by high speed blending. After the Nitrosan has been dispersed, the Sylgard 182 curing agent and phenolic micro-balloons are combined with the Sylgard 182 resin and thoroughly mixed. The fully mixed composition is then poured into the reinforcing honeycomb structure. The honeycomb structure, with uncured ablative material therein, is placed in an enclosure, and the pressure within the enclosure is reduced to approximately 10 torr to de-air the composition, assuring a uniformly foamed, cellular structure. The honeycomb structure filled with the de-aired ablative material is placed in an autoclave or suitable vessel adapted for being heated and pressurized. The ablative material in the honeycomb structure is cured and foamed at a temperature of about 200° F. to 250° F., under a pressure of 35 to 60 p.s.i.g., for three hours. After the three hour cure, the heat shield structure is removed from the autoclave, and the excess ablative material is removed from the structure surface. Should the three hours curing in the autoclave be insufficient to achieve a complete cure, the structure may be placed in an oven at 200° F. until fully cured. It will be understood that the temperature and pressure utilized during the curing of the ablative material may be varied to produce different density finished structures. Thus, by controlling the temperature and pressure, the cellular structure and density of the ablative material may be selectively controlled. The pressure produces very uniform and controlled cell sizes in the foamed ablator. This foamed ablator is much more uniform than foamed material which is foamed at normal atmospheric pressure. It is very important to be able to control the cell size in a thermal insulating material because in this way one can control the thermal conductivity of the material.

EXAMPLE NO. 3

| Material: | Percent by weight |
| --- | --- |
| Sylgard 182 resin | 76.00 |
| Sylgard 182 curing agent | 7.60 |
| Nitrosan (N,N' - dimethyl - N,N' - dinitroso-terephthalamide) | 2.53 |
| Lampblack | 0.62 |
| Carbon fibers | 0.62 |
| Tipersul | 2.53 |
| Phenolic micro-balloons | 10.10 |
| | 100.00 |

Process

The carbon fibers are dispersed in a high speed blender to separate and chop the fibers. The materials are combined and mixed thoroughly. The uncured ablative material is poured into the reinforcement structure or honeycomb. The ablative material is de-aired as previously mentioned in Example No. 2 and is cured in accordance with the same curing schedule as set forth in Example No. 2.

Referring to FIG. 3, a test fixture 30 for testing the foamed ablative materials of Examples Nos. 1 through 3, includes a sample holder 31 which retains honeycomb fiber glass sandwich 32. The sandwich 32 is one inch thick and three inches in diameter. A thermocouple 33 is provided at the upper face of the fiber glass honeycomb 32 on the outer surface of the face. Surrounding the honeycomb 32 is an insulating sleeve 34 and a fiber glass retaining ring 35. A sample of the honeycomb heat shield structure 20 is secured in the sample holder with its base 21 seated against the fiber glass sandwich and abutting thermocouple 33. The depth of heat shield structure 20 for testing is of a thickness to provide 4 lbs. per sq. ft., surface density for the test sample. The fiber glass retaining ring 35 and the insulating sleeve 34 are cut even with the heat shield structure 20. A test heat shield 20 was prepared for each of the three specific examples set forth. The heat shields were tested by exposing the open portion of the test specimen to heat flux from an oxy-acetylene torch at 56.5 B.t.u.'s per ft.$^2$-sec.

The non-foamed or solid ablative heat shield test specimen was prepared from the following composition: 80% by weight Sylgard 182 including curing agent, 9.6% by weight potassium titanate fibers and 9.6% by weight hollow silica spheres, 0.8% by weight dry boric acid. The components were combined and thoroughly mixed, and were then poured into a honeycomb structure similar to that illustrated in FIGS. 1 and 2 and cured for four hours at 150° F. The material had a uniform solid texture and a density of about 54 lbs. per cu. ft.

Referring to FIG. 4, curve A illustrates the solid high density specimen. Curve B represents the foamed ablative structure of Example No. 1. Curve C represents Example No. 2 and curve D represents specific Example No. 3.

The graph of FIG. 4 displays the bond line temperature at the inner face between the sandwich structure 32 and the base of the test structure as the ordinate and time in minutes as the abscissa. When the temperature of the sample had reached 300° F., heating was terminated and a peak temperature recorded. It was observed that the solid material of curve A had a peak temperature of 540° F. and the foam material of curves C and D had a peak temperature of 475° F.

The foregoing disclosure is merely exemplary, and sets forth several preferred embodiments of the invention. For instance, although the foamed ablative material is disclosed to be within the honeycomb interstices, it may be used alone as a unit structure.

It will be appreciated that various changes to the heat shield and various other ablative materials may be utilized in the invention for achieving a heat shield with the low density cellular, ablative material construction.

What is claimed is:

1. A thermal insulating and ablative heat shield for a re-entry spacecraft comprising
   (a) a substrate,
   (b) a thermal insulating honeycomb positioned on the substrate so that one end of the honeycomb cells is closed by the substrate and the other end is open to receive re-entry heat directly,
   (c) and a foamed ablation material filled into the honeycomb cells, said material having a density of less than about 25#/ft.$^3$ and being of substantially uniform consistency throughout, said material being principally a flexible elastomeric solid silicone cured from a fluid silicone by a platinum catalyst and is constituted of (1) a high polymer dimethyl siloxane fluid having a small proportion of vinyl substituents and having dissolved therein a solid resinous copolymer of slicia and $R_3SiO_{1/2}$ in which the R groups are principally methyl with a small proportion of vinyl, the total vinyl constituting less than 10 mol percent of the total organo substituents bonded to silicon in the fluid, and (2) an amount of a phenyl, methyl and hydrogen substituted fluid silicone, having substantially 2 hydrogens per 7 phenyl radicals on a mol basis, sufficient to provide substantially equivalent hydrogen and vinyl in the organo-polysiloxane.

2. The structure of claim 1 including a minor amount of a filler including hollow spheres.

3. The structure of claim 1 wherein the substrate is a phenolic resin.

4. The structure of claim 3 wherein the honeycomb is phenolic impregnated fiber glass.

5. A method of making thermal insulating and ablative heat shields for spacecraft comprising the steps of
   (a) positioning a thermal insulating honeycomb onto a substrate with the substrate closing one end of the honeycomb cells and with the other end of the cells open,
   (b) positioning a fluid composition into the honeycomb cells through the open end thereof, said composition comprising a fluid silicone curable to a solid and having substituents selected from the group consisting of phenyl, methyl and combinations thereof, and a foaming agent,
   (c) de-airing the composition,
   (d) placing the resultant unit into an enclosure where pressure and heat are applied substantially simultaneously to foam and cure the composition, the pressure being about 35 p.s.i.g. to about 60 p.s.i.g. and the temperature being about 200° F. to about 350° F., thereby filling the honeycomb with a solidified composition having a density below 25#/ft.$^3$, and
   (e) attaching the structure to the leading re-entry surface of a space aft whereby the open ends of the cells receive re-entry heat directly.

6. The method of claim 5 including the step of blending a minor amount of a filler including hollow spheres into the composition prior to filling the honeycomb.

7. The method of claim 5 wherein the composition is foamed over the top of the open cell ends and including the step of removing the excess foam to present a smooth re-entry surface.

8. The method of claim 5 wherein the silicone is curable to a flexible elastomeric solid by a platinum catalyst and is constituted of (1) a high polymer dimethyl siloxane fluid having a small proportion of vinyl substituents and having dissolved therein a solid resinous copolymer of silica and $R_3SiO_{1/2}$ in which the R groups are principally methyl with a small proportion of vinyl, the total vinyl constituting less than 10 mol percent of the total organo substituents bonded to silicon in the fluid, and (2) an amount of a phenyl, methyl and hydrogen substituted fluid silicone, having substantially 3 hydrogens per 7 phenyl and methyl radicals on a mol basis, sufficient to provide substantially equivalent hydrogen and vinyl in the organo-polysiloxane.

References Cited

UNITED STATES PATENTS

| | | |
|---|---|---|
| 2,655,485 | 10/1953 | Hoffman. |
| 2,744,042 | 5/1956 | Pace _____ 161—68 XR |
| 2,803,606 | 8/1957 | Weyer. |
| 3,067,469 | 12/1962 | Yarrison _____ 156—247 XR |
| 3,210,233 | 10/1965 | Kummer et al. _____ 161—68 |
| 3,229,936 | 1/1966 | Quillman _____ 244—155 |
| 3,345,245 | 10/1967 | Hanusa _____ 156—78 XR |

ROBERT F. BURNETT, Primary Examiner

R. H. CRISS, Assistant Examiner

U.S. Cl. X.R.

102—105; 156—79; 161—160, 206, 208; 244—1